United States Patent
Jung et al.

(10) Patent No.: US 9,262,984 B2
(45) Date of Patent: Feb. 16, 2016

(54) DEVICE AND METHOD FOR CONTROLLING ROTATION OF DISPLAYED IMAGE

(75) Inventors: Ji-su Jung, Chungcheongbuk-do (KR); Yong-gook Park, Yongin-si (KR); Ju-il Eom, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 85 days.

(21) Appl. No.: 13/611,943

(22) Filed: Sep. 12, 2012

(65) Prior Publication Data

US 2013/0176341 A1      Jul. 11, 2013

(30) Foreign Application Priority Data

Jan. 10, 2012   (KR) .......................... 10-2012-0003087

(51) Int. Cl.
| | | |
|---|---|---|
| G09G 5/00 | (2006.01) | |
| G06F 1/16 | (2006.01) | |
| G06K 9/00 | (2006.01) | |
| H04M 1/725 | (2006.01) | |

(52) U.S. Cl.
CPC ................ *G09G 5/00* (2013.01); *G06F 1/1626* (2013.01); *G06K 9/00228* (2013.01); *H04M 1/72569* (2013.01); *G06F 2200/1614* (2013.01); *G09G 2320/0261* (2013.01); *G09G 2340/0492* (2013.01); *H04M 2250/52* (2013.01)

(58) Field of Classification Search
None
See application file for complete search history.

(56) References Cited

U.S. PATENT DOCUMENTS

| | | | |
|---|---|---|---|
| 2008/0239131 A1 | 10/2008 | Thorn | |
| 2009/0239579 A1* | 9/2009 | Lee et al. | 455/556.1 |
| 2010/0016014 A1* | 1/2010 | White | 455/556.1 |
| 2010/0141571 A1* | 6/2010 | Chiang et al. | 345/102 |
| 2011/0098024 A1* | 4/2011 | Shin et al. | 455/414.1 |
| 2012/0051590 A1* | 3/2012 | Hsu | 382/103 |
| 2012/0098999 A1* | 4/2012 | Chen | 348/231.5 |
| 2013/0121584 A1* | 5/2013 | Bourdev et al. | 382/190 |

FOREIGN PATENT DOCUMENTS

| | | |
|---|---|---|
| JP | 09-044143 | 2/1997 |
| KR | 1020050087941 | 9/2005 |
| KR | 1020090101733 | 9/2009 |
| KR | 1020110093464 | 8/2011 |
| KR | 1020110130190 | 12/2011 |

* cited by examiner

*Primary Examiner* — James A Thompson
(74) *Attorney, Agent, or Firm* — The Farrell Law Firm, P.C.

(57) ABSTRACT

A device and method for controlling rotation of a displayed image is provided. The device includes a sensor unit for detecting whether the device has been rotated; a photography unit for taking a picture of the face of a user in response to a determination that the device is rotated; a rotation determination unit for determining a rotation of the displayed image based on the captured face image of the user; and an image rotation unit for rotating the displayed image according to the determined rotation of the displayed image.

20 Claims, 4 Drawing Sheets

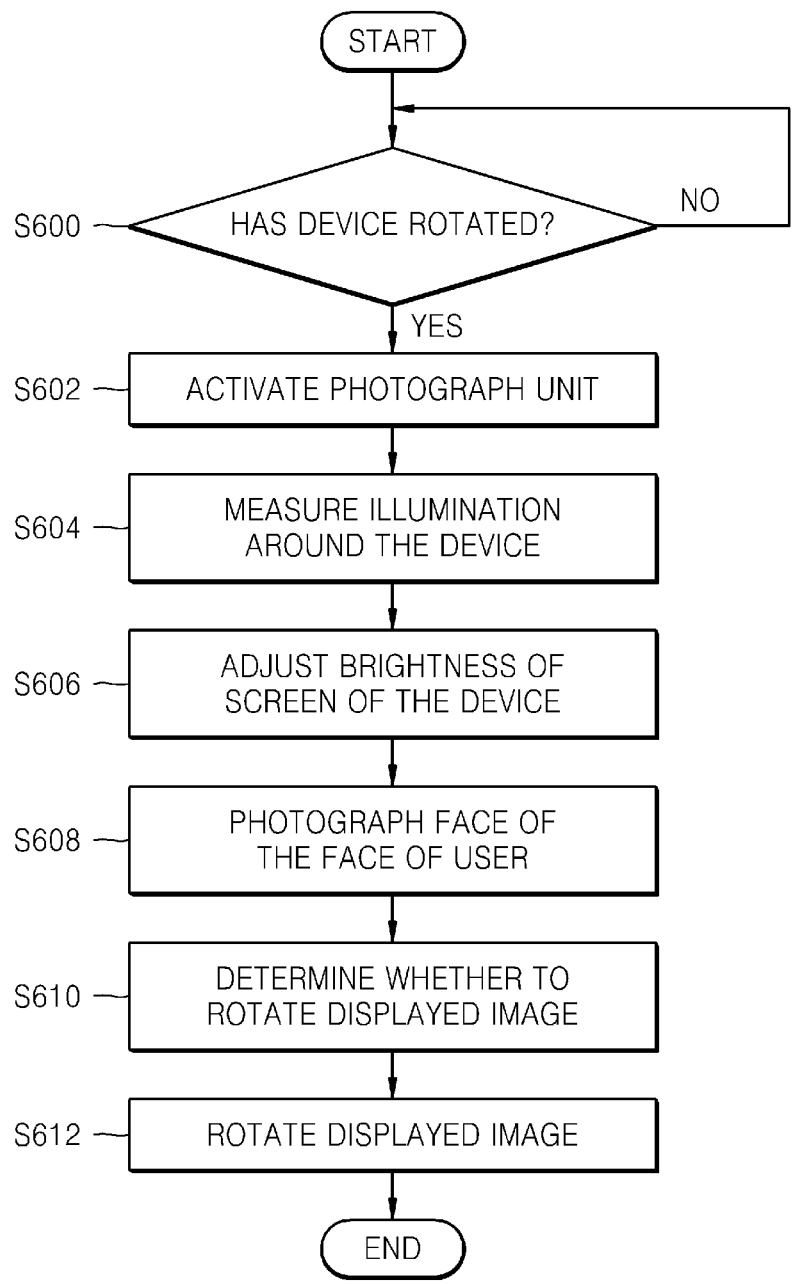

DEVICE AND METHOD FOR CONTROLLING ROTATION OF DISPLAYED IMAGE

PRIORITY

This application claims priority under 35 U.S.C. §119(a) to Korean Patent Application No. 10-2012-0003087, filed on Jan. 10, 2012, in the Korean Intellectual Property Office, the entire contents of which is incorporated herein by reference.

BACKGROUND OF THE INVENTION

1. Field of the Invention

The present invention relates generally to a device and method for controlling rotation of a displayed image, and, more particularly, to a device and method for using a captured image of a user to control rotation of an image displayed on a screen.

2. Description of the Related Art

Some recent devices for displaying images may display images by rotating them with respect to a rotation state of the devices.

Specifically, when such a device is positioned vertically, the device outputs a displayed image by rotating the displayed image in a vertical orientation; and when positioned horizontally, the device outputs the displayed image by rotating the device into a horizontal orientation.

However, since conventional devices tend to take only the rotation state of the devices into consideration in determining the orientation of the displayed image, the displayed image may rotate inappropriately, which causes problems for users when viewing the inappropriately rotated image.

Accordingly, a new technology for effectively determining whether to rotate a displayed image is required.

SUMMARY OF THE INVENTION

Accordingly, the present invention is designed to address at least the above-described problems and/or disadvantages occurring in the prior art, and to provide at least the advantages described below.

An aspect of the present invention is to provide a device and method for controlling rotation of a displayed image by determining whether to rotate the displayed image based on a captured face image of a user when the device has been rotated.

Another aspect of the present invention is to provide a device and method for controlling the rotation of displayed images by determining a rotational direction based on a face image of a user.

Another aspect of the present invention is to provide a device and method for controlling the rotation of displayed images, whereby a face image of a user is effectively captured.

According to an aspect of the present invention, a device for controlling rotation of a displayed image is provided. The device includes a sensor unit for detecting whether the device has been rotated; a photography unit for taking a picture of the face of a user in response to a determination that the device is rotated; a rotation determination unit for determining a rotation of the displayed image based on the captured face image of the user; and an image rotation unit for rotating the displayed image according to the determined rotation of the displayed image.

According to another aspect of the present invention, a method of controlling rotation of a displayed image is provided. The method includes determining whether a device has been rotated; photographing a face of a user upon a determination that the device is rotated; determining a rotation of the displayed image based on the captured face image of the user; and rotating the displayed image based on the determined rotation of the displayed image.

According to another aspect of the present invention, a computer readable recording medium having programs embodied thereon, for performing a method of controlling rotation of a displayed image, when executed by a computer, is provided. The method includes determining whether a device has been rotated; photographing a face of a user upon a determination that the device is rotated; determining a rotation of the displayed image based on the captured face image of the user; and rotating the displayed image based on the determined rotation of the displayed image

BRIEF DESCRIPTION OF THE DRAWINGS

The above and other features and advantages of the present invention will become more apparent by describing in detail embodiments thereof with reference to the attached drawings in which:

FIG. 6 is a flowchart illustrating a method of controlling the rotation of the displayed image, according to an embodiment of the present invention.

DETAILED DESCRIPTION OF EMBODIMENTS OF THE PRESENT INVENTION

Hereinafter, embodiments of the present invention will be described with reference to the accompanying drawings. Various specific definitions found in the following description are provided only to help general understanding of the present invention, and it is apparent to those skilled in the art that the present invention can be implemented without such definitions. A detailed description of known functions and configurations incorporated herein will be omitted for the sake of clarity and conciseness.

Throughout the following description, the term "connecting" or other similar terms are not limited exclusively to direct coupling but may also refer to "electrically coupling".

Figure 1:
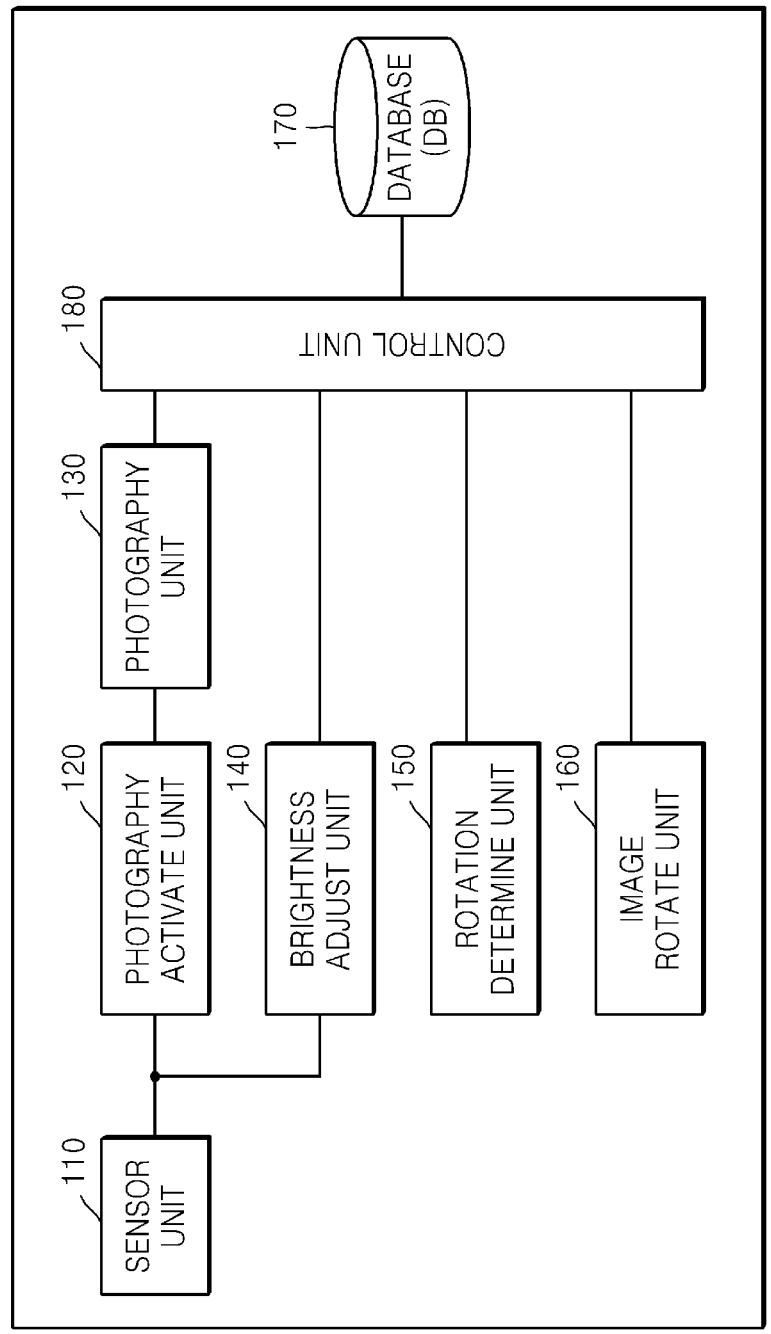
FIG. 1 is a detailed block diagram illustrating a device for controlling rotation of a displayed image, according to an embodiment of the present invention.

FIG. 1 is a detailed block diagram illustrating a device for controlling rotation of a displayed image, according to an embodiment of the present invention.

Referring to FIG. 1, the device includes a sensor unit 110, a photography activation unit 120, a photography unit 130, a brightness adjustment unit 140, a rotation determination unit 150, an image rotation unit 160, a DataBase (DB) 170, and a control unit 180.

The sensor unit 110 detects whether the device has been rotated. Herein, "rotation" of a device is defined as a change in the orientation and/or rotational position of the device. The sensor unit 110 detects whether the device has been rotated on the basis of an angle between a direction of a vertical axis of the device and a gravitational direction. The sensor unit 110 includes, for example, an acceleration sensor, a gyro sensor, and/or a gravity sensor for detecting rotation, but is not limited thereto. The sensor unit 110 determines that the device has been rotated when the angle between the vertical direction of the device and the gravitational direction is changed by a value at least equal to a preset threshold. Although the sensor unit 110 may detect whether the device has been rotated on the basis of the angle between the vertical direction of the device and the gravitational direction, embodiments of the present invention are not limited to this manner of detecting the rotation. For example, the sensor unit 110 may detect whether the device has been rotated by checking whether the angle between the direction of the vertical axis of the device and the gravitational direction is less than or equal to 45°, or less than or equal to 45°.

Furthermore, the sensor unit 110 detects illumination around the device. The sensor unit 110 detects the illumination around the device by using, for example, an illumination sensor, but embodiments of the present invention is not limited thereto, and other methods for detecting illumination may be used in accordance with embodiments of the present invention.

The photography activation unit 120 activates the photography unit 130 based on whether the device has been rotated. Upon determining that the device has been rotated, the photography activation unit 120 activates the photography unit 130. Accordingly, by waiting for a determination that the device has been rotated before activating the photography unit 130, the device saves the power spent on photographing an image of a user of the device.

The photography unit 130 takes a picture of the face of the user. The photograph unit 130 may take a picture of the face of the user with a camera mounted on the front of the device.

The illumination adjustment unit 140 adjusts brightness of a screen of the device based on the illumination around the device. The illumination adjustment unit 140 may increase the brightness of the screen of the device when a value of the illumination around the device is less than or equal to a preset threshold. For example, the illumination adjustment unit 140 may adjust the brightness of the screen of the device by controlling a back-light contained in a display unit of the device, but embodiments of the present invention not limited to such an operation for adjusting brightness, and other methods for adjusting brightness may be used in accordance with embodiments of the present invention.

The rotation determination unit 150 determines whether to rotate a displayed image in the device based on the captured face image of the user. For example, the rotation determination unit 150 determines whether to rotate the displayed image based on the shape of an eye in the captured face image of the user. The rotation determination unit 150 analyzes the shape of the eye in the captured face image to determine horizontal and vertical directions of the eye. In addition, the rotation determination unit 150 determines whether to rotate the displayed image based on an angle between the horizontal direction of the eye and the displayed image. The rotation determination unit 150 may determine to rotate the displayed image when the angle between the horizontal direction of the eye and the displayed image is, for example, in a range from 50° to 90°, but other ranges may be used in accordance with embodiments of the present invention. Furthermore, the rotation determination unit 150 determines whether to rotate the displayed image based on an angle between the vertical direction of the eye and the horizontal direction of the displayed image, but other methods of determining whether to rotate the image may be used in accordance with embodiments of the present invention.

The rotation determination unit 150 may also determine whether to rotate the displayed image based on a direction of a line connecting the eyes in the captured face image. The rotation determination unit 150 may also determine whether to rotate the displayed image based on an angle between the direction of the line and the horizontal direction of the displayed image. The rotation determination unit 150 determines to rotate the displayed image when the angle between the direction of the line and the horizontal direction of the displayed image is, for example, in a range from 50° to 90°, but is not limited thereto. Furthermore, the rotation determination unit 150 may determine whether to rotate the displayed image based on an angle between the direction of the line and the vertical direction of the displayed image, but is not limited thereto.

The rotation determination unit 150 may also determine whether to rotate the displayed image based on a shape of hair of the face image. For example, the rotation determination unit 150 may identify the vertical direction of the face image of the user based on a direction in which a protruding part of the shape of the hair faces and determine whether to rotate the displayed image based on an angle between the vertical direction of the face image of the user and the horizontal direction of the displayed image.

The rotation determination unit 150 may also determine whether to rotate the displayed image based on positions of the hair and other face parts in the face image. The rotation determination unit 150 identifies the vertical direction of the face image of the user based on, for example, the positions of the hair and the other face parts. In this case, the rotation determination unit 150 refers to the shape of the hair to identify the vertical direction of the face image. In addition, the rotation determination unit 150 determines whether to rotate the displayed image based on an angle between the vertical direction of the face image of the user and the horizontal direction of the displayed image.

The rotation determination unit 150 may also determine whether to rotate the displayed image based on positions of an eye and an eyebrow in the face image. The rotation determination unit 150 identifies the vertical direction of the face image of the user based on the positions of the eye and the eyebrow. In this case, the rotation determination unit 150 refers to the shapes of the eye and the eyebrow to identify the vertical direction of the face image. In addition, the rotation determination unit 150 may determine whether to rotate the displayed image based on an angle between the vertical direction of the face image of the user and the horizontal direction of the displayed image.

The image rotation unit 160 rotates the displayed image output from the device. Upon a determination that the device has rotated, the image rotation unit 160 rotates the displayed image, based upon the determination of the rotation determination unit 150. Otherwise, upon determining that the device has not rotated, the image rotation unit 160 prevents the displayed image from being rotated, based on the determination of the rotation determination unit 150.

The image rotation unit 160 rotates the displayed image in the vertical or horizontal direction of the device. When rotating the displayed image in the vertical direction of the device, the displayed image may rotate such that the upper part of the displayed image appears in the upper part of the device. When rotating the displayed image in the horizontal direction of the device, the displayed image may rotate such that the upper part of the displayed image is placed in a reverse gravitational direction.

The image rotation unit 160 determines the direction in which the displayed image should rotate based on the face image of the user. When performing rotation based on the face image, the image rotation unit 160 may rotate the displayed image such that upper parts of the face of the user and the displayed image corresponds to each other based on at least one of the positions of the eye, and the eyebrow and the hair in the face image of the user, for example. However, other parts of the face may be used in accordance with other embodiments of the present invention. In the present example, the direction in which the displayed image should rotate may be determined on the basis of a curve of outlines of the eye, the eyebrow and the hair.

The DB 170 stores various information used in order for the device to determine whether to rotate the displayed image based on the face image of the user. The DB 170 stores a set value of whether the device should rotate the displayed image according to the angle between the vertical direction of the face image of the user and the horizontal direction of the displayed image, but other values may be stored for performing such a determination in accordance with embodiments of the present invention.

The control unit 180 controls overall operations of the device, and, in particular, controls the sensor unit 110, the photography activation unit 120, the photograph unit 130, the brightness adjustment unit 140, the rotation determination unit 150, the image rotation unit 160 and the DB 170 to allow the device to photograph the face of the user and determine whether to rotate the displayed image based on the direction of the captured face image.

Referring to FIGS. 2 to 5, a method of determining the rotation of the displayed image based on the face image of the user is performed by the rotation determination unit 150, according to an embodiment of the present invention.

Figure 2:
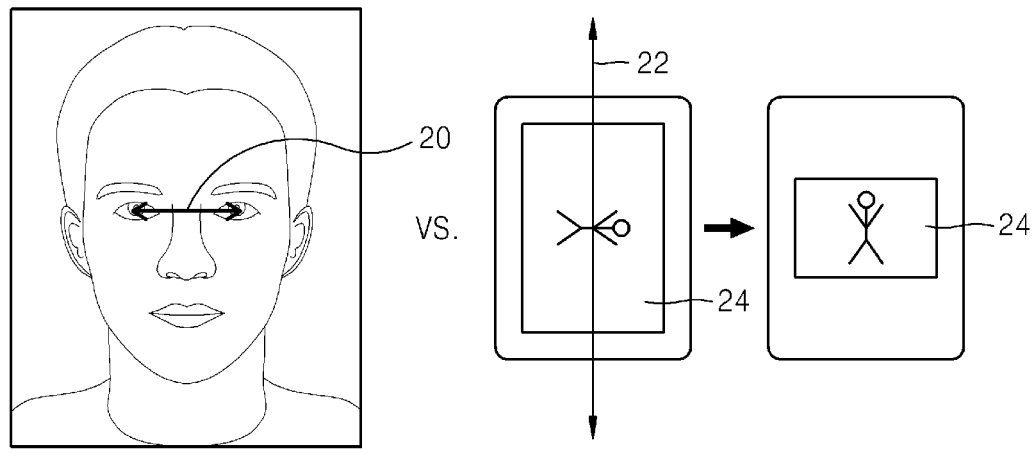
FIG. 2 is a diagram illustrating an example of determining the rotation of the displayed image based on a position of an eye in a face image of a user, which is performed by a rotation determination unit, according to an embodiment of the present invention.

FIG. 2 is a diagram illustrating an example of determining the rotation of a displayed image based on a position of an eye in the face image of the user, which is performed by a rotation determination unit, according to an embodiment of the present invention.

As shown in FIG. 2, according to an embodiment of the present invention, the rotation determination unit 150 compares a direction of a line 20 connecting the eyes in the face image of the user with a direction of a horizontal axis 22 of the displayed image 24. The rotation determination unit 150 then determines whether to rotate the displayed image 24 based on the angle between the line 20 and the horizontal axis 22. The rotation determination unit 150 determines to rotate the displayed image 24 when the angle between the line 20 and the horizontal axis 22 is, for example, in a range from 50° to 90°. The rotational direction of the displayed image 24 may be also determined based on positions of at least one of eyebrows, nose, mouth and hair in the face image in combination with the position of the line 20.

Figure 3:
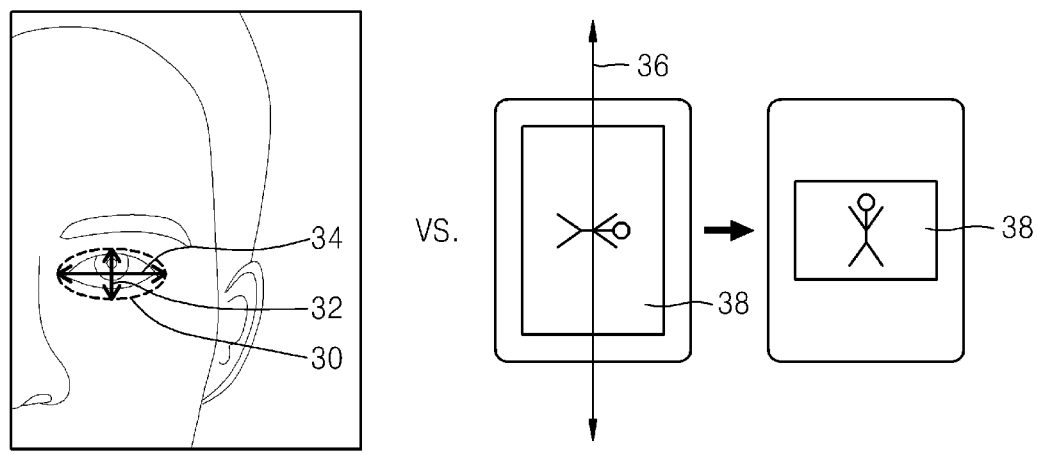
FIG. 3 is a diagram illustrating an example of determining the rotation of the displayed image based on a shape of an eye in the face image of the user, which is performed by the rotation determination unit, according to an embodiment of the present invention.

FIG. 3 is a diagram illustrating an example of determining the rotation of a displayed image based on a shape of an eye in the face image of the user, which is performed by a rotation determination unit, according to an embodiment of the present invention.

As shown in FIG. 3, according to another embodiment of the present invention, the rotation determination unit 150 detects an outline 30 of an eye in the face image of the user and determines a vertical axis 32 and a horizontal axis 34 of the eye by means of the detected outline 30. The rotation determination unit 150 determines whether to rotate the displayed image 38 based on an angle between the horizontal axis 34 of the eye and the horizontal axis 36 of the displayed image 38. The rotation determination unit 150 determines to rotate the displayed image 38 when the angle between the horizontal axes 34 and 36 of the eye and the displayed image 38 is, for example, in a range from 50° to 90°. By determining whether to rotate the displayed image 38 by checking up on the shape of an eye of the user, the rotation determination unit 150 effectively determines rotation even when only a portion of the face of the user is captured. In addition, the rotational direction may be determined on the basis of positions of eyebrows, eyes, nose, mouth and hair of the user in combination with the outline 30 of the eye.

Figure 4:
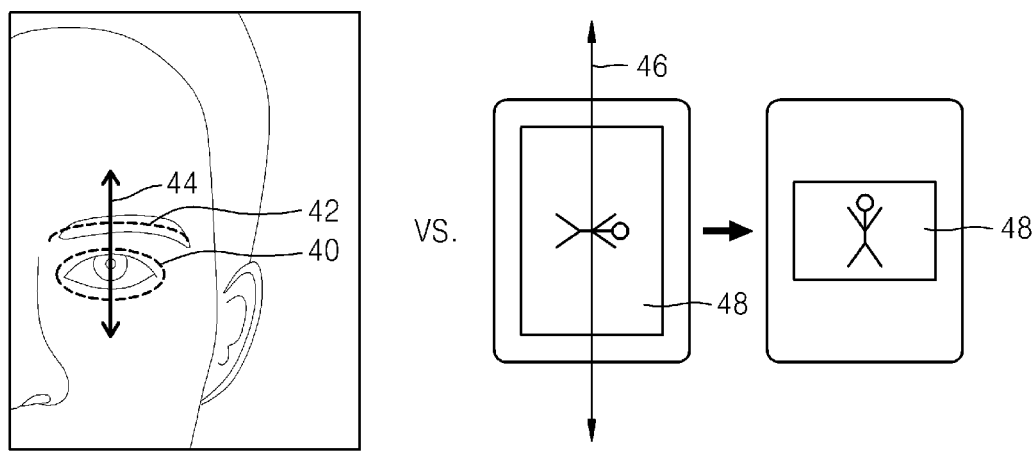
FIG. 4 is a diagram illustrating an example of determining the rotation of the displayed image based on positions of an eye and an eyebrow in the face image of the user, which is performed by the rotation determination unit, according to an embodiment of the present invention.

FIG. 4 is a diagram illustrating an example of determining the rotation of a displayed image based on positions of an eye and an eyebrow in the face image of the user, which is performed by the rotation determination unit, according to an embodiment of the present invention.

As shown in FIG. 4, according to another embodiment of the present invention, the rotation determination unit 150 determines whether to rotate the displayed image 48 based on the positions of the eye and the eyebrow in the face image of the user. For example, the rotation determination unit 150 may detect outlines 40 and 42 of the eye and the eyebrow in the face image of the user and use the outlines 40 and 42 in order to identify the positions of the eye and the eyebrow.

In addition, the rotation determination unit 150 may identify a position of a protruding part in the vertical direction of the eye from the outline of the eye and determine the direction of a vertical axis 44 of the face image on the basis of the identified position of the protruding part of the eye. Furthermore, the rotation determination unit 150 determines whether to rotate the displayed image 48 based on an angle between the vertical axis 44 of the user face and a horizontal axis 46 of the displayed image 48. The rotation determination unit 150 determines to rotate the displayed image 48 when the angle between the vertical direction 44 of the face image of the user and the horizontal direction 46 of the displayed image 48 is, for example, in a range from 0° to 40°. The rotational direction is determined on the basis of positions of the eye and the eyebrow in the face image.

Figure 5:
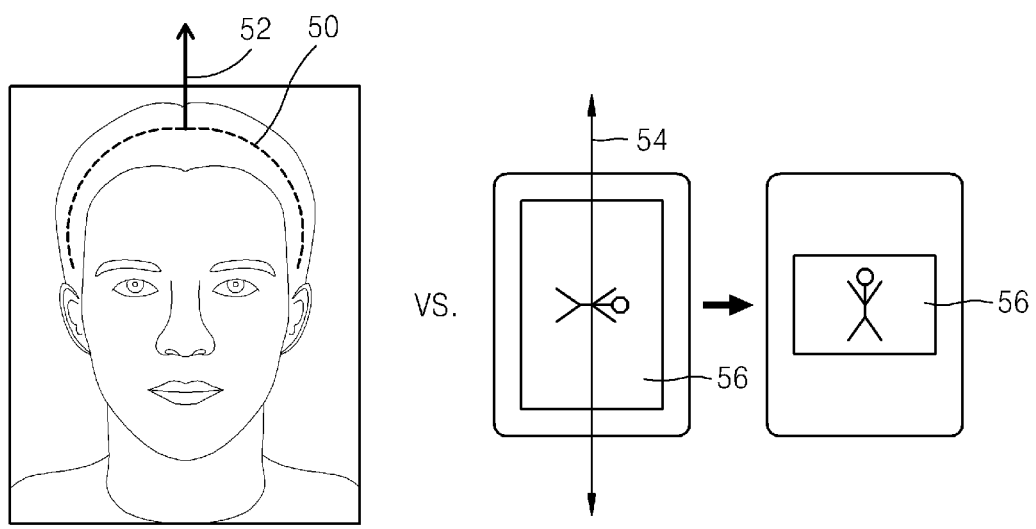
FIG. 5 is a diagram illustrating an example of determining the rotation of the displayed image based on a position of hair in the face image of the user, which is performed by a rotation determination unit, according to an embodiment of the present invention.

FIG. 5 illustrates an example of determining the rotation of a displayed image based on the position of the hair in the face image of the user, which is performed by the rotation determination unit, according to an embodiment of the present invention.

As shown in FIG. 5, the rotation determination unit 150 detects an outline 50 of the hair in the face image of the user and identifies the direction of a vertical axis 52 of the face image of the user based on a position of a protruding part of the outline 50 of the hair. Furthermore, the rotation determination unit 150 determines whether to rotate the displayed image 56 based on an angle between the vertical axis 52 of the user face and a horizontal axis 54 of the displayed image 56. The rotation determination unit 150 determines to rotate the displayed image 56 when the angle between the vertical axis 52 of the face image of the user and the horizontal axis 54 of the displayed image 56 is, for example, in a range from 0° to 40°. The rotational direction is determined on the basis of the direction of the protruding part of the outline 50 of the hair.

The method of controlling the rotation of the displayed image according to an embodiment of the invention will now be explained with reference to FIG. 6.

FIG. 6 is a flowchart illustrating a method of controlling the rotation of the displayed image, according to the embodiment of the present invention.

In step S600, the device determines if it has been rotated. In this regard, the device detects whether it has been rotated on the basis of an angle between the direction of the vertical axis of the device and the gravitational direction. The device detects whether it has been rotated by means of, for example, at least one of the acceleration sensor, the gyro sensor and the gravity sensor.

The device determines that it has been rotated when the angle between the direction of the vertical axis of the device and the gravitational direction is changed to be above a preset threshold. The device may also detect whether it has been rotated on the basis of an amount of an angle between the direction of the vertical axis of the device and the gravitational direction. For example, the device may detect whether the device has been rotated by checking whether the angle between the direction of the vertical axis of the device and the gravitational direction is 45° or more, or 45° or less.

Upon a determination that the device has rotated in step S600, the device activates the photography unit 130 for a preset period of time, in step S602.

In step S604, the device measures illumination around the device by using an illumination sensor mounted on the device.

In step S606, the device adjusts brightness of the screen of the device based on the illumination around the device. The device increases the brightness of the screen of the device when a value of the illumination around the device is less than or equal to a preset threshold. For example, the device may adjust the brightness of the screen of the device by controlling the brightness of a backlight contained in a display unit of the device, but other operations for adjusting the brightness may be used in accordance with embodiments of the present invention.

In step S608, the device takes a picture of the face of the user via the photography unit 130 mounted on the front of the device.

In step S610, the device determines whether to rotate the displayed image. The device determines whether to rotate the displayed image based on the face image of the user. Alternatively, the device may determine whether to rotate the displayed image based on the shape of an eye in the captured face image of the user. The device analyzes the shape of the eye in the captured face image to identify the horizontal and vertical directions of the eye. In addition, the device may determine whether to rotate the displayed image based on an angle between the horizontal directions of the eye and the displayed image. The device determines to rotate the displayed image when the angle between the horizontal directions of the eye and the displayed image is, for example, in a range from 50° to 90°, but is not limited thereto. Furthermore, the device may determine whether to rotate the displayed image based on an angle between the vertical direction of the eye and the horizontal direction of the displayed image, but other operations for determining whether to rotate the displayed image may be used in accordance with embodiments of the present invention.

The device may also determine whether to rotate the displayed image based on the direction of a line connecting the eyes in the captured face image, or based on an angle between the direction of the line and the vertical direction of the displayed image. The device determines to rotate the displayed image when the angle between the direction of the line and the horizontal direction of the displayed image is, for example, in a range from 50° to 90°, but other ranges may be used in accordance with embodiments of the present invention. Furthermore, the device may determine whether to rotate the displayed image based on an angle between the direction of the line and the vertical direction of the displayed image, but is not limited thereto.

The device may alternatively determine whether to rotate the displayed image based on the shape of the hair in the face image. For example, the device may identify the vertical direction of the face image of the user based on the direction in which a protruding part of the shape of the hair faces and determine whether to rotate the displayed image based on an angle between the vertical direction of the face image of the user and the horizontal direction of the displayed image.

The device may alternatively determine whether to rotate the displayed image based on positions of the hair and other parts of the face in the face image. The device identifies the vertical direction of the face image of the user based on, for example, the positions of the hair and the other face parts. In this case, the device refers to the shape of the hair to identify the vertical direction of the face image. The device may also determine whether to rotate the displayed image based on an angle between the vertical direction of the face image of the user and the horizontal direction of the displayed image.

The device may alternatively determine whether to rotate the displayed image based on positions of an eye and an eyebrow in the face image. The device identifies the vertical direction of the face image of the user based on the positions of the eye and eyebrow. In this case, the device may refer to the shapes of the eyes and eyebrows to identify the vertical direction of the face image. The device may also determine whether to rotate the displayed image based on an angle between the vertical direction of the face image of the user and the horizontal direction of the displayed image.

In step S612, the displayed image is rotated when the device has been rotated or, is prevented from being rotated, based on the determination made in step S610.

The device rotates the displayed image in the vertical or horizontal direction of the device. In the case of rotating the displayed image in the vertical direction of the device, the displayed image rotates such that the upper part of the displayed image appears in the upper part of the device. On the other hand, in the case of rotating the displayed image in the horizontal direction of the device, the displayed image rotates such that the upper part of the displayed image is placed in a reverse gravitational direction.

The device determines the direction in which the displayed image should rotate based on the face image of the user. The device rotates the displayed image such that upper parts of the face of the user and the displayed image correspond to each other based on at least one of the positions of the eye and eyebrow in the face image of the user, but the device may rotate the image based upon other facial information in accordance with embodiments of the present invention.

The embodiments of the present invention can also be embodied as computer readable codes on a computer readable recording medium. Herein, a computer readable recording medium refers to any data storage device that can store data that can be thereafter read by a computer system. Examples of the computer readable recording medium include volatile, nonvolatile, removable and non-removable media. The computer readable recording medium can also be distributed over network coupled computer systems so that the computer readable code is stored and executed in a distributed fashion.

According to an embodiment of the present invention, whether to rotate a displayed image may be determined based on a face image of a user when the device has been rotated. Also, according to another embodiment of the present invention, a rotational direction of a displayed image may be determined based on a face image of a user. According to further another embodiment of the present invention, a face image of a user may be effectively captured to be used for rotation of a displayed image.

While the present invention has been particularly shown and described with reference to certain embodiments thereof, it will be understood by those of ordinary skill in the art that various changes in form and details may be made therein without departing from the spirit and scope of the present invention as defined by the following claims.

What is claimed is:

1. A device for controlling rotation of a displayed image, the device comprising:
   a sensor unit for detecting whether the device has been rotated;
   a controller for determining whether the device is rotated, and adjusting brightness of a screen of the device based on illumination around the device after determining that the device is rotated; and
   a camera for taking a picture of the face of a user after determining that the device is rotated, after adjusting the brightness of the screen of the device,
   wherein the controller is configured to determine a rotation of the displayed image based on the captured face image of the user, and rotate the displayed image according to the determined rotation of the displayed image.

2. The device of claim 1, wherein the controller is further configured to activate the camera upon detecting that the device has been rotated.

3. The device of claim 1, wherein the controller is further configured to determine the rotation of the displayed image based on a shape of an eye in the face image.

4. The device of claim 3, wherein the controller is further configured to determine the rotation of the displayed image based on at least one of a direction of horizontal and vertical axes of the eye.

5. The device of claim 1, wherein the controller is further configured to determine the rotation of the displayed image based on a direction of a line connecting eyes in the face image.

6. The device of claim 1, wherein the controller is further configured to determine whether to rotate the displayed image based on a shape of hair in the face image.

7. The device of claim 6, wherein the controller is further configured to determine a rotational direction of the displayed image based on the shape of the hair in the face image.

8. The device of claim 1, wherein the controller is further configured to determine whether to rotate the displayed image based on positions of an eye and an eyebrow in the face image.

9. The device of claim 8, wherein the controller is further configured to determine a rotational direction of the displayed image based on the positions of the eye and eyebrow in the face image.

10. The device of claim 1, wherein the sensor unit measures the illumination around the device.

11. A method of controlling rotation of a displayed image, the method comprising:
    determining whether a device has been rotated;
    adjusting brightness of a screen of the device based on illumination around the device after determining that the device is rotated;
    photographing a face of a user upon a determination that the device is rotated, after adjusting the brightness of the screen of the device;
    determining a rotation of the displayed image based on the captured face image of the user; and
    rotating the displayed image based on the determined rotation of the displayed image.

12. The method of claim 11, further comprising: activating a photography unit upon a determination that the device has been rotated,
    wherein photographing the face of the user includes photographing the face of the user with the activated photography unit.

13. The method of claim 11, wherein determining the rotation of the displayed image includes determining the rotation of the displayed image based on a shape of an eye in the face image.

14. The method of claim 13, wherein determining the rotation of the displayed image includes determining the rotation of the displayed image based on at least one of a direction of horizontal and vertical axes of the eye.

15. The method of claim 11, wherein determining the rotation of the displayed image includes determining the rotation of the displayed image based on a direction of a line connecting eyes in the face image.

16. The method of claim 11, wherein determining of rotation of the displayed image includes determining whether to rotate the displayed image based on a shape of hair in the face image.

17. The method of claim 16, further comprising determining a rotational direction of the displayed image based on the shape of the hair in the face image,
    wherein rotating the displayed image includes rotating the displayed image in the determined rotational direction.

18. The method of claim 11, wherein determining the rotation of the displayed image includes determining whether to rotate the displayed image based on positions of an eye and an eyebrow in the face image.

19. The method of claim 18, further comprising determining the rotational direction of the displayed image based on the positions of the eye and the eyebrow in the face image,
    wherein rotating the displayed image includes rotating the displayed image in the determined rotational direction.

20. A non-transitory computer readable recording medium having programs embodied thereon, which perform, when executed by a computer, a method comprising:
    determining whether a device has been rotated;
    adjusting brightness of a screen of the device based on illumination around the device after determining that the device is rotated;
    photographing a face of a user upon a determination that the device is rotated, after adjusting the brightness of the screen of the device;
    determining a rotation of the displayed image based on the captured face image of the user; and
    rotating the displayed image based on the determined rotation of the displayed image.

* * * * *